Aug. 20, 1968 A. E. BREWSTER 3,398,289

COMMUNICATION SYSTEM UTILIZING PHOTOSENSITIVE ARRAYS

Filed March 18, 1965

Inventor
ARTHUR E. BREWSTER
By Philip M. Bolton
Attorney 3,398,289

COMMUNICATION SYSTEM UTILIZING PHOTOSENSITIVE ARRAYS

Arthur Edward Brewster, Aldwych, London, England, assignor to International Standard Electric Corporation, New York, N.Y., a corporation of Delaware Filed Mar. 18, 1965, Ser. No. 440,838
Claims priority, application Great Britain, Apr. 6, 1964, 14,004/64
10 Claims. (Cl. 250—238)

ABSTRACT OF THE DISCLOSURE

Apparatus for communicating with low temperature data processing equipment within a cryogenic container, including at least one pair of two dimensional arrays composed of light emitting sources and photodetecting devices, one array being outside the cryogenic container and connected to external equipment, the other array being inside the cryogenic container and connected to the data processing equipment, the arrays being located in parallel planes and having complementary patterns, and focusing means situated on an optical path into the container whereby the light emitting sources in one array are focused on to corresponding photodetectors on the other array.

This invention relates to apparatus for communicating with low temperature data processing equipment situated within a cryogenic container.

One of the difficulties of using wire connections from external equipments to superconducting devices is that the wires provide a heat conduction path, especially since there are very often a number of such wire connections. Also inductive coupling between the wires can cause noise in the circuits associated therewith.

According to the invention apparatus for communicating with low temperature data processing equipment within a cryogenic container includes at least one pair of two dimensional arrays composed of light emitting sources and photodetecting devices, one array being outside the cryogenic container and connected to external equipment, the other array being inside the cryogenic container and connected to the data processing equipment, the arrays being located in parallel planes and having complementary patterns, and focusing means situated on an optical path into the container whereby the light emitting sources in one array are focused on to corresponding photodetectors on the other array.

Two embodiments of the invention will now be described with reference to the accompanying drawing which illustrates diagrammatically a superconducting computer coupled by means of light beams to external equipments, such as the input and output sections of the computer in which.

Figures 1, 2:
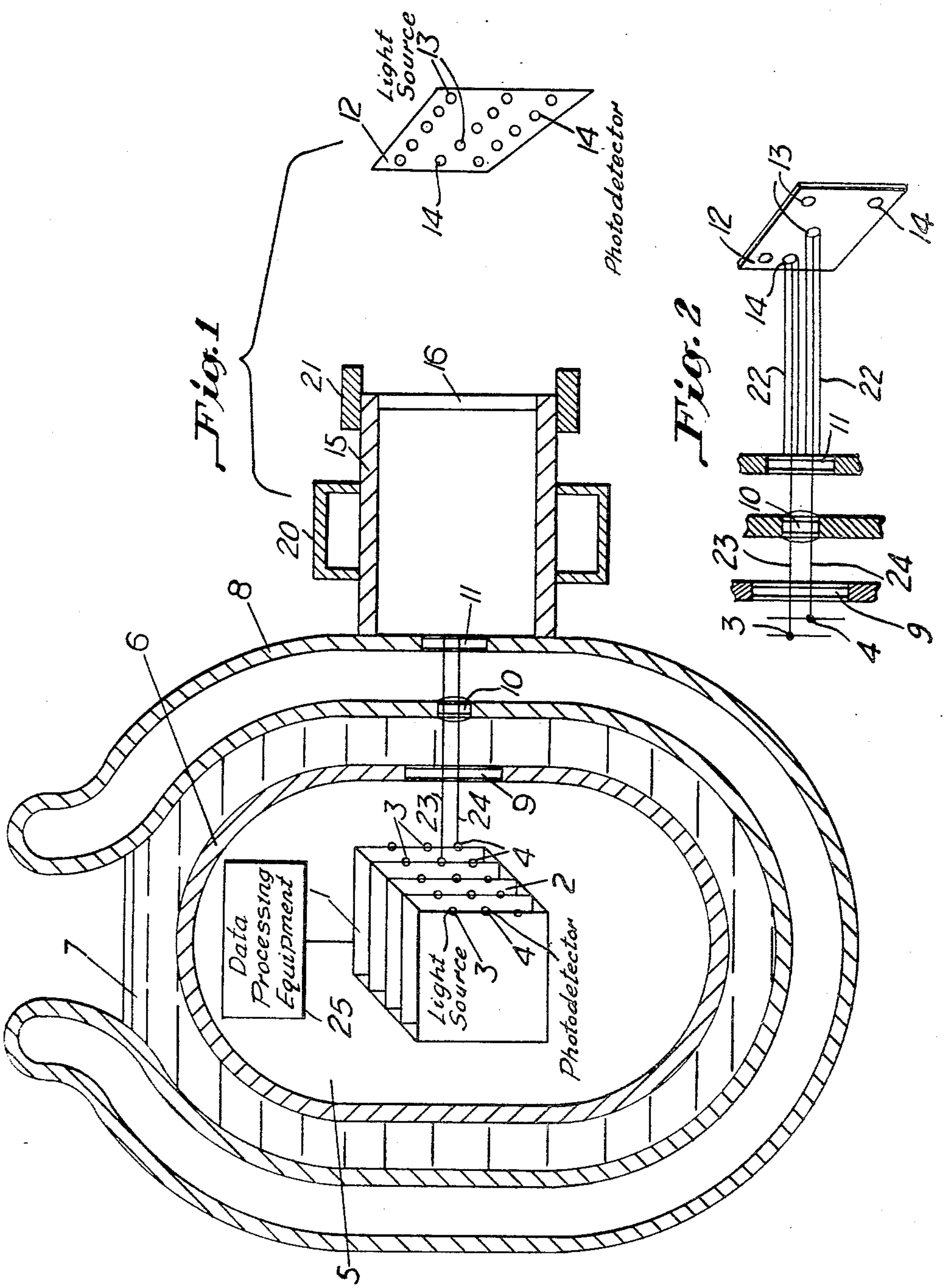
FIGURE 1 represents the communication system according to the preferred embodiment of the invention.
FIGURE 2 represents a partial cross section of the invention utilizing fibre optics.

The computer is illustrated in the form of a number of printed circuit boards 1 carrying the super-conducting elements which make up the computing circuits, and these boards are interconnected with one another by any suitable means to make up a block of equipment one face 2 of which is formed by the edges of the printed circuit boards 1. The edges of the boards 1 are provided with a number of light emitting sources 3 and photodetectors 4 which are connected to the computing circuits. The light emitting sources 3 and the photodetectors 4 are arranged in the form of a two dimensional array which corresponds to the face 2. The computer 25 is located within a dried atmosphere 5 in a sealed container 6 which is immersed in liquid helium 7 in order to obtain the necessary low temperature for the superconducting components. The liquid helium is itself contained within a double walled vessel 8, the space between the inner and outer walls of the vessel 8 being evacuated. The inner container 6 and the double walled vessel 8 are provided with windows 9, 10 and 11 opposite the array of optical devices 3 and 4.

A second two dimensional array 12 of optical devices is placed outside the cryogenic equipment and is composed of light emitting sources 13 and photodetectors 14 in a pattern similar to but complementary to that of the array within the cryogenic container, and is connected to the appropriate input and output circuits for the computer.

Whilst the windows 9 and 11 are plain windows, the window 10 includes a focusing lens so that when the two arrays 2 and 12 are placed parallel to one another about an axis passing through the window 10 the light emitting sources on the array 2 will be focused upon photodetectors in the array 12 and vice versa. Since all the light paths between the two arrays 2 and 12 pass through a common focusing point in the window 10 the latter can be of small area compared with the area covered by each array. Similarly the windows 9 and 11 are of smaller area than either array.

Light beams can be modulated by signals at very high frequencies and provide an extremely efficient form of communication over short distances. They do not provide heat paths and can be accurately focused to prevent intermodulation effects between closely spaced light beams and beams which pass through a common focusing point.

In order to overcome misting effects which may occur on the outer face of the window 11 a tube 15 may be mounted with one end sealed against the outer wall of the vessel 8 so that it encompasses the window 11, the other end of this tube 15 including a window 16. The tube 15 is cooled by member 20 to reduce the temperature gradient between the inner and outer faces of the window 11. The window 16 incorporates a heating layer 21 which prevents the outside of the window 16 from misting up. Although heat is generated in the window 16 the effect of this heat on the cryogenic equipment is negligible since the window 16 can be some distance from the window 11, and the intervening space is cooled. The tube 15 is either evacuated or contains a dehydrated gas.

Where the light emitting sources are lasers the problem of focusing is greatly reduced since lasers have an inherent narrow beam spread. Furthermore, superconducting lasers provide extremely compact sources of light when utilized as output devices in a superconducting computer. Power requirements are not very great and power can be supplied to the superconducting computer in the same manner as data, i.e. as a beam of light.

In an alternative arrangement the external array 12 can be coupled to the window 11 by means of a number of fibre optic links 22 through which light beam 23 is directed from source 3 to detector 14 while beam 24 is directed from source 13 to detector 4.

Whilst the description relates specifically to arrays combining both light emitting sources and photodetectors it is also envisaged that the input to the computer may comprise two arrays, the external one carrying a battery of lasers and the internal one a corresponding number of photodetectors, whilst the computer output comprises another pair of two dimensional arrays, the inner one carrying the light sources and the external one carrying the photodetectors.

What I claim is:

1. Apparatus for communicating with low temperature data processing equipment within a cryogenic container, including at least one pair of two dimensional arrays, each array composed of light emitting sources and photodetecting devices, one array being outside the cryogenic container and connected to external equipment, the other array being inside the cryogenic container and connected to the data processing equipment, the arrays being located in parallel planes and having complementary patterns, and focusing means situated on an optical path into the container whereby the light emitting sources in one array are focused on to corresponding photodetectors on the other array.

2. Apparatus according to claim 1, and in which the focusing means comprises a lens inserted in the wall of the cryogenic container.

3. Apparatus according to claim 2, and in which the low temperature data processing equipment is contained within a cryogenic container comprising a multi-walled vessel or combination of vessels, the optical path between the two light arrays passing through windows situated one in each of the walls.

4. Apparatus according to claim 3, and comprising means for preventing the external surface of the outermost window from misting.

5. Apparatus according to claim 4, and in which said means for preventing misting of the outer window comprises a tube, one end of which encompasses the window, the end of the tube being sealed against the wall surrounding the window, the other end of the tube containing a window, and comprising means for cooling the tube.

6. Apparatus according to claim 5 further comprising means for evacuating the tube.

7. Apparatus according to claim 5, and in which the tube is filled with a dehydrated gas.

8. Apparatus according to claim 4, and in which the means for preventing misting includes fibre optic links between the external array and the external surface of the window.

9. Apparatus according to claim 1, and in which the light sources are lasers.

10. Apparatus according to claim 1, in which the input to the low temperature data processing equipment comprises one pair of two-dimensional arrays the external one carrying a plurality of light sources and the internal one a corresponding number of photodetectors, and in which the output from the equipment comprising another pair of two-dimensional arrays the internal one comprising a plurality of light sources and the external one a corresponding number of photodetectors.

References Cited

UNITED STATES PATENTS

| | | | |
|---|---|---|---|
| 2,207,097 | 7/1940 | Logan | 250—238 X |
| 2,567,036 | 9/1951 | Shannon | 250—227 |
| 3,118,130 | 1/1964 | Rediker et al. | 307—88.5 |
| 3,193,685 | 7/1965 | Burstein | 307—88.5 |
| 3,221,170 | 11/1965 | Sylvander | 250—213 |
| 3,258,602 | 6/1966 | Promish | 250—83.3 |

FOREIGN PATENTS

| | | |
|---|---|---|
| 926,796 | 5/1963 | Great Britain. |
| 926,797 | 5/1963 | Great Britain. |

WALTER STOLWEIN, *Primary Examiner.*